United States Patent Office

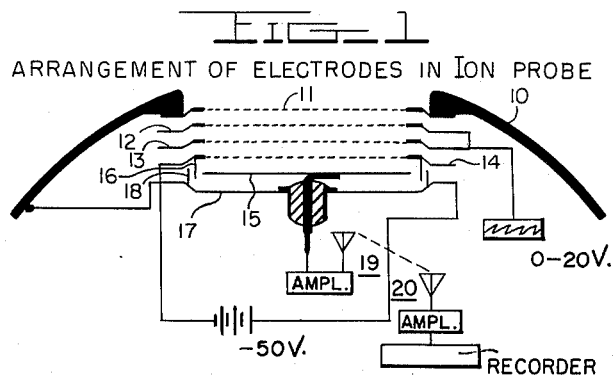
FIG. 1 — ARRANGEMENT OF ELECTRODES IN ION PROBE
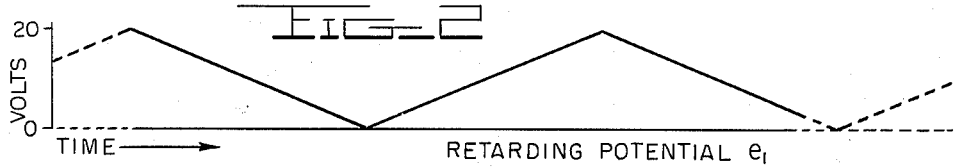
FIG. 2 — RETARDING POTENTIAL $e_1$
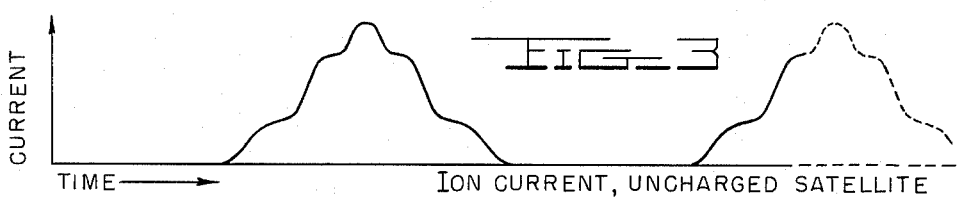
FIG. 3 — ION CURRENT, UNCHARGED SATELLITE
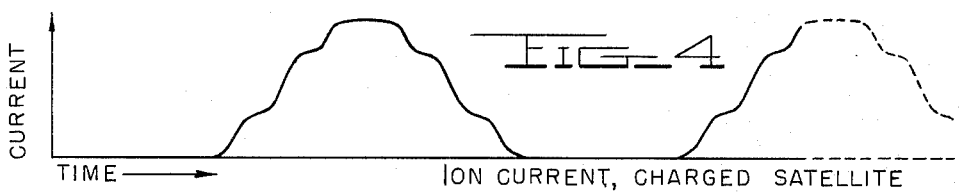
FIG. 4 — ION CURRENT, CHARGED SATELLITE
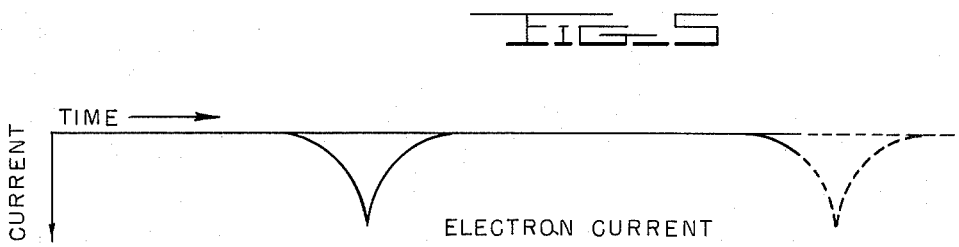
FIG. 5 — ELECTRON CURRENT
*INVENTOR*
WILLARD H. BENNETT
BY
*ATTORNEY*

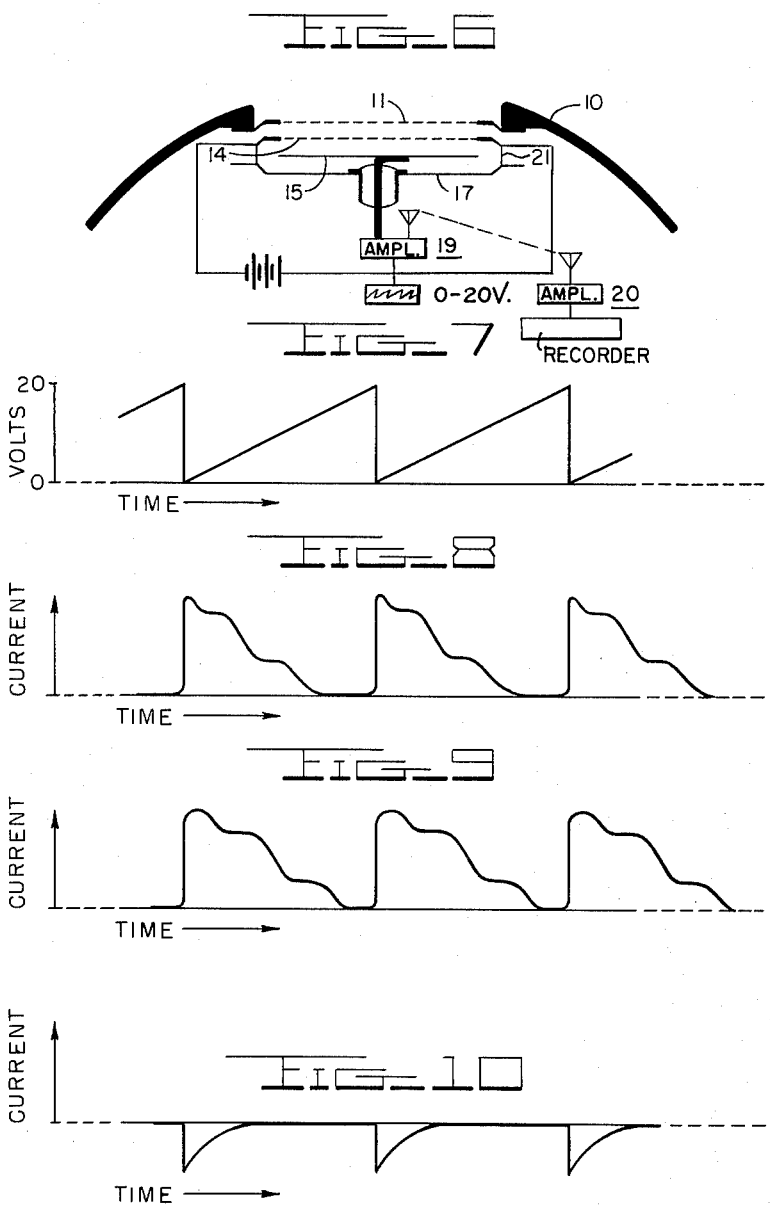

3,222,562
Patented Dec. 7, 1965

3,222,562
**ION PROBE FOR MEASURING INTER-
PLANETARY MEDIUM**
Willard H. Bennett, 5032 Kaplan Drive, Raleigh, N.C.
Filed Dec. 29, 1961, Ser. No. 163,373
10 Claims. (Cl. 313—231)
(Granted under Title 35, U.S. Code (1952), sec. 266)

The invention described herein may be manufactured and used by or for the Government of the United States of America for governmental purposes without the payment of any royalties thereon or therefor.

The present invention is directed to apparatus for measuring directly the properties of interplanetary plasma and more particularly to apparatus for measuring directly in space the ionic composition, the temperature of each species of ions, the velocity of the vehicle through the medium, and the electrical charge on the vehicle and the electron velocity distribution.

Heretofore, different types of equipment have been flown on space vehicles such as rockets and satellites to gather various types of information. Such instrumentation included cameras, radio frequency mass spectrometers, and other specially designed devices for carrying out research on specific problems. One basic drawback in prior art instruments using grids and collector plates is the fact that ions and electrons striking the grids and collector produce secondary electron emissions which may tend to mask the currents of incoming ions being measured. Another drawback is the production of photo-electron emissions from the grids and collector plates due to the far ultraviolet and X-radiations from the sun.

The present invention is directed to an "ion probe" as a device for measuring interplanetary medium. The ion probe comprises a plurality of grids made of knitted wire nets positioned in a parallel plane geometry arrangement to which appropriate positive or negative electrical potentials are applied depending on the particle to be detected.

The electrical potentials are applied to certain grids such that desired particles to be detected are passed on to the collector whereas the undesired particles are repeled by the grids and prevented from being passed on to the detector. Also, the grids may have a varying electrical potential applied thereto to pass particles of a certain charge and then to provide a cut-off for the particles being passed whereby they will be rejected altogether.

It is, therefore, an object of the present invention to provide an instrument which suppresses the effects from secondary electron emissions as well as photoelectron emissions.

Another object is to provide a device for directly measuring the ionic composition, the temperature of each species, the velocity of the vehicle through the medium and the electrical charge on the vehicle.

Yet another object is to provide a device which is simple in construction and operation, light weight and yet rugged in structure.

Sill another object is to provide a device for detecting and measuring particles having a particular charge.

The nature of this invention, as well as other objects and advantages thereof, will be readily apparent from consideration of the following specification relating to the annexed drawing, in which:

FIG. 1 represents a schematic drawing which illustrates the arrangement of the electrode structure of the device;

FIG. 2 represents a segment of a zigzag waveform applied to the retarding grid;

FIG. 3 illustrates a curve which represents an ion current of an uncharged vehicle;

FIG. 4 illustrates a curve which represents an ion current of a charged vehicle;

FIG. 5 illustrates a curve which represents an electron current;

FIG. 6 illustrates a modification of the ion probe shown by illustration in FIG. 1;

FIG. 7 illustrates a segment of a saw-tooth sweep applied to the control grid;

FIG. 8 illustrates a curve for the ion current output of an uncharged vehicle resulting from a positive saw-tooth control sweep;

FIG. 9 illustrates a curve for the ion current output of a charged vehicle resulting from a positive saw-tooth control sweep; and FIG. 10 illustrates a curve for the electron current output obtained from application of a negative saw-tooth control sweep.

The device of this invention utilizes knitted fine wire grids positioned within a carrier vehicle between an opening to the medium surrounding the vehicle and a collector plate with a shielding plate on the opposite side of the collector plate. The knitted fine wire grids have appropriate potentials applied thereto to permit passage of desired particles to the collector and to block passage of undesired particles with an electrode having a changing potential applied thereto to cut off the passage of particular particles to the collector. Thus the energy of the particles can be determined, as well as the temperature and other parameters.

Now referring to the drawings, there is shown in FIG. 1, for illustrative purposes only, a schematic of an arrangement which illustrates the relative parts of one suitable device for carrying out the invention. The device is positioned within the shell or body 10 of a carrier vehicle such as a satellite or rocket and open to ambient atmosphere as shown. The device, as shown in FIG. 1, includes four parallel grids 11–14 made with knitted wire nets having an open area of more than seventy-five percent when stretched into position in the device and is made of one-mil tungsten wire, however, it can be made of smaller or larger wire with greater or less mesh. A first grid 11 is grounded to the shell 10, the second and third grids 12 and 13 are electrically connected together and spaced from each other, with the fourth grid 14 positioned adjacent to a collector plate 15. The fourth grid is provided with a collar or skirt 16 which extends downwardly surrounding the circumference of the collector plate. The collector plate is supported by and insulated from a shielding plate 17 located on the opposite side of the collector plate from the knitted grids. The shielding plate 17 is also provided with a collar or skirt 18 which extends upwardly to surround the collar 16 on the fourth grid and the collector plate 15 such that the collars 16 and 18 telescope each other and serve as a static shield surrounding the collector plate.

In operation of the device, shown by illustration in FIG. 1, for detection and measurement of positive ions, the following potentials are applied to the electrodes. Grid 11 is normally grounded to the skin of the vehicle and will naturally be maintained at the surface potential. The shielding plate 17 is grounded to the vehicle skin with the collector plate connected to a full feedback amplifer circuit which holds the potential of the collector plate at approximately the potential of the satellite skin. The electrically connected grids 12 and 13 are swept with a zigzag pulse or a saw-tooth pulse from 0 volt to positive 20 volts and returned every two seconds as shown respectively in FIGS. 2 and 7 or at any other repetition rate desired by use of a pulse source well known in the art. The potential on grid 14 is maintained at a steady negative 50 volts to suppress secondary and photo-electrons from the collector plate and to turn back all electrons entering from outside the vehicle with energies less than 50 electron-volts. A smaller potential may be used with only a slight loss of discrimination. The vehicle will be moving through the atmosphere, therefore, differently charged particles will be admitted into the device through the first grid. Since grids 12 and 13 have a potential swept between 0 and positive 20 volts applied thereto, positive particles of different energies will be permitted to pass grids 12 and 13. At zero potential all positively charged particles would pass where the negatively charged grid 14 will repel all electrons and negatively charged ions as well as suppress the photo-electric and secondary electron emissions from the collector plate. Grid 14 will permit the positively charged ions to pass to the collector where a current representative of the incident positive ions, as shown in FIGS. 3, 4, 8 and 9 for different conditions, will be produced and directed to a suitable well known amplifier and telemetering system 19 connected thereto which transmits a signal representative of the collected current. A receiver-recorder 20 receives and records the signal which can then be analyzed. As the potential on electrodes 12 and 13 builds up from zero to a positive 20 volts those positive ions of lesser energies will be cut off from passing the grids and will be repelled thereby. Those positive ions having greater energies than the rising cut-off potential on the grids 12 and 13 will pass and be detected which results in a curve as shown in FIG. 3 for the zigzag pulse and in FIG. 8 for the saw-tooth pulse. After rising to a positive 20 volts, the potential is brought back to zero. For the zigzag pulse the potential is decreased from 20 volts to zero over the same period as the rising pulse; however, for the saw-tooth pulse the pulse drops immediately to zero and starts immediately on its rising pulse. Thus, for the zigzag pulse the curve for the rising pulse from zero to 20 volts will be similar to the curve for the pulse from 20 volts to zero as shown in FIG. 3. The curve for the saw-tooth pulse will be as shown in FIG. 8. In this manner the energies of the ions can be determined which results in a measurement of the density of positive ions, their temperature, etc. Use of the zigzag sweep results in dissymmetries in the records illustrated in FIGS. 3, 4 and 5, if there is any malfunction in the equipment causing a delay in the responses to the incoming ion or electron currents. Use of the saw-tooth sweep does not provide this kind of redundancy.

If the vehicle is uncharged and moving at a velocity of $8 \times 10^5$ cm./sec. in the direction normal to the planes of the grids, the current will be as shown by the curve of FIGS. 3 and 8. The protons will be cut off when the pulse potential is 0.3 volt, the positive nitrogen and oxygen ions will be cut off when the varying voltage is approximately 4.2 volts and other ions will be cut off as the potential progresses towards a positive 20 volts. For the saw-tooth pulse the voltage drops immediately to zero and starts its rise again, whereas for the zigzag pulse, the pulse is dropped to zero in reverse order wherein the ions will be passed in reverse order as shown in FIG. 3.

Research has indicated that the skin of a vehicle traveling through space may have a potential of negative two volts at altitudes of about 250 kilometers. In case each species of ions arrives at the ion probe with the same energy bonus of about two electron-volts, the spectra are displaced by that amount as illustrated in FIGS. 4 and 9. Each species of ions will be cut off at a potential of two additional volts from the above described which affects the output curve as shown. In this manner, the charge on the satellite can be determined by observing the current output curve.

FIG. 6 illustrates a modification of the device shown by illustration in FIG. 1 and includes fewer grids. As shown, the grid doublet 12 and 13 shown in the device of FIG. 1 has been omitted and the shielding collars 16 and 18 on grids 14 and shielding plate 17 shown in FIG. 1 have been interconnected through a single collar 21 surrounding the collector plates. The physical structure of the grids, collector plate and shielding plates are the same as described for the device shown in FIG. 1.

In operation of the ion-probe, illustrated in FIG. 6 for positive ion detection and measurement, a retarding potential, either a zigzag potential or a saw-tooth potential, is applied as the base potential of the amplifier which is connected to the collector thereby sweeping the collector between zero and 20 volts positive relative to the skin of the vehicle. Grid 14 is maintained at a negative potential of 50 volts to prevent the passage of negative ions and electrons through the grid to the collector electrode. As described previously for the ion probe of FIG. 1 when the potential applied to the collector is zero all positively charged ions will pass grid 14 while the negative particles are rejected thereby. Then as the collector is swept from zero to positive 20 volts, the specie of positive ions having a corresponding greater energy will be passed to present current output curves as shown respectively in FIGS. 3 and 8, for an applied zigzag pulse and a saw-tooth pulse. Obviously the zigzag pulse has an output curve during the rising half cycle and the decreasing half cycle whereas the saw-tooth increases to a maximum of 20 volts positive falls off immediately to zero and starts over again. The curves illustrated in FIGS. 4 and 9 represent a vehicle having a negative charge of two volts as described for the device of FIG. 1.

If the ionized medium is thermalized, the temperature of each species of ion can be determined from the slope of the current curve half-way down on the step for that species of ion as follows: The distribution in any one component of velocity, $u$, is such that the number of particles per cc., and per unit velocity interval is $$\frac{dn}{du} = n \left\{ \frac{m}{2\pi kT} \right\}^{1/2} e^{-\frac{mu^2}{2kT}}$$

where $n$ is the numerical density of the ions, $m$ is the mass of an ion, $k$ is Boltzmann's constant, and $T$ is the temperature in degrees Kelvin. If, now, $u$ is made to represent the component of velocity in the direction of motion of the satellite, and relative to the satellite, the expression becomes $$\frac{dn}{du} = n \left\{ \frac{m}{2\pi kT} \right\}^{1/2} e^{-\frac{m(u-u_0)^2}{2kT}}$$

where $n$ is the numerical density of the ions, $m$ is the mass of the ion, and $u_0$ is the velocity of the satellite through the thermalized medium. The slope of the current curve is $$\epsilon u_0 \frac{dn}{dE} \cdot \frac{dE}{dt} A = (n\epsilon u_0 A) \frac{dE}{dt} \cdot \left\{ \frac{m}{2\pi kT} \right\}^{1/2} e^{-\frac{m(u-u_0)^2}{2kT}} \cdot \frac{1}{mu}$$

Halfway down on the step, $u = u_0$ (approximately) and $$\frac{di}{dt} = \frac{i}{u_0} \cdot \frac{dE}{dt} (2\pi mkT)^{-1/2}$$

from which the temperature T can be obtained:

$$T = \left\{ \frac{i}{u_0} \frac{dE}{dt} \bigg/ \frac{di}{dt} \right\}^2 \bigg/ 2\pi mk$$

One of the most important observations to be made is the fidelity with which each species of ion follows a maxwellian velocity distribution. Any significant departure from a maxwellian distribution which changes with time reveals a turbulent motion of the medium.

The same device as illustrated by FIG. 1 can be used for measuring electron velocity distributions through use of differently applied potentials arranged to pass electrons and repel positively charged particles. Grids 12 and 13 are swept with a varying potential from zero volts to negative 10 volts and returned every two seconds or at any other desired time. Grid 14 and the shielding plate 17 are grounded to the satellite whereas the potential applied to the collector plate is held at a steady positive 20 volts. The potential on the collector plate supresses secondary and photo electron emission effects from the collector plate and to turn back all positive ions entering from the outside of the satellite. The measurement of electrons is carried out as described above for positive ions wherein the applied pulses permit all entering electrons to pass on to the collector when the applied potential on grids 12 and 13 is at zero. As the potential is swept to negative 10 volts the electrons with increasingly greater energies will be cut off from the collector, then, from negative 10 volts back to zero, more electrons will be permitted to pass on to the collector to present a curve such as shown in FIGS. 5 and 10, that is, if the electron energy distribution is approximately maxwellian. The measurement of electrons for each type pulse is determined from the curves.

The ion-probe device illustrated in FIG. 6 can be used for measuring electron velocity distributions through use of different applied potential arranged to pass electrons and repel positively charged particles. Grid 11 is secured to the skin of the vehicle and therefore has the same charge as the vehicle. Grid 14 is held at a positive 20 volts and the collector electrode is swept from zero volts to a potential of negative 10 volts. The sweeping voltage can be of different pulse shapes such as a zigzag or saw-tooth as shown in FIGS. 2 and 7 and will produce a current curve for detected electrons such as represented by the curves of FIGS. 5 and 10 depending on the pulse shape as explained above for the device represented by FIG. 1.

If the ionized medium is well thermalized, one way in which the vehicle at 500 km. could acquire a potential of $-2$ volts is for the electrons to have a temperature T, which can be calculated as follows: assuming that the vehicle behaves like a sphere whose diameter is $d$. If the ion density is $n$ per cc., the ion current swept up by the vehicle moving a velocity $u_0$ is approximately $$n \epsilon u_0 \pi d^2 / 4$$

where $\epsilon$ is the electron charge. The vehicle acquires a potential V at which the electron current reaching the vehicle equals the ion current in magnitude. The mean velocity of electrons is so much larger than the vehicle velocity that the electrons may be considered to approach the vehicle nearly uniformly from all directions with a current equal to $$\pi d^2 \cdot n \cdot \epsilon \left\{ \frac{kT}{2\pi m} \right\}^{1/2} e^{\frac{-\epsilon V}{kT}}$$

Equating the two current magnitudes, a transcendental equation can be obtained.

$$T = \frac{2\epsilon V}{k \ln \frac{8kT}{\pi m u_0^2}}$$

which is independent of both the density, $n$, of the medium and of the diameter, $d$, of the vehicle. For a vehicle speed $8 \cdot 10^5$ cm./sec. and a potential V of 2 volts, the temperature is 5700° K. This is substantially larger than the temperatures usually supposed to prevail at 500 km. altitude, and for a vehicle to acquire a potential of 2 volts may require an electron velocity distribution which is richer in the larger velocities than in a maxwellian distribution.

The potentials on the electrodes can be commutated between the set for observing the ion spectrum and the set for observing the electron spectrum. This has the advantage that in addition to measuring both spectra, any change in the ratio between maximum electron current and maximum ion current is repeatedly tested for.

The electrode structures shown in FIGS. 1 and 6 are each capable of carrying out the detection and measurement of ions and electrons of the upper atmosphere. The switching mechanism, control circuits, telemetering, and recording equipment are all well known in the art and form no part of the present invention.

Obviously many modifications and variations of the present invention are possible in the light of the above teachings. It is therefore to be understood that within the scope of the appended claims the invention may be practiced otherwise than as specifically described.

What is claimed is:

1. A device for detecting and measuring ions and electrons in the upper atmosphere which comprises an ion and electron inlet in which said inlet is open to ambient atmosphere, at least two grid type electrodes positioned across said inlet, a collector electrode positioned relative to one of said electrodes, and a shielding electrode positioned on the opposite side of said collector from said grid type electrodes, said electrodes being secured in spaced relationship in axial alignment relative to said inlet.

2. A device as claimed in claim 1 which includes a collar surrounding said collector electrode and connected with said shielding electrode.

3. A device for detecting and measuring ions and electrons in the upper atmosphere which comprises an ion and electron inlet in which said inlet is open to ambient atmosphere, a first grid positioned across said inlet, at least one grid positioned inward from said first grid, a collector electrode positioned inwardly of said innermost grid, a shielding electrode inwardly of said collector electrode and a shielding collar surrounding said collector electrode, said electrodes and said shielding collar being secured in spaced relationship in axial alignment relative to said inlet.

4. A device for detecting and measuring ions and electrons in the upper atmosphere which comprises an ion and electron inlet in which said inlet is open to ambient atmosphere, a first grid positioned across said inlet, an inner grid spaced therefrom, a collector electrode adjacent to and inwardly of said inner grid, a shielding electrode inwardly of said collector electrode on the opposite side from said inner grid and a shielding collar surrounding said collector electrode and electrically secured to said inner grid and said shielding electrode, said grids and electrodes being secured in spaced relationship in axial alignment relative to said inlet.

5. A device for detecting and measuring ions and electrons in the upper atmosphere which comprises an ion and electron inlet in which said inlet is open to ambient atmosphere, a first grid secured across said inlet, a double grid spaced from said first grid, a collector plate spaced inwardly from said double grid, a returning grid positioned between said collector plate and said double grid and a shielding plate positioned below said collector plate, said grids, said collector plate and said shielding plate being secured in spaced relationship in axial alignment relative to said inlet.

6. A device for detecting and measuring ions and electrons in the upper atmosphere which comprises an ion and electron inlet in which said inlet its open to ambient atmosphere, a first grid adapted to be connected to the skin of a carrier vehicle, second and third grids spaced from each other and electrically connected to each other, a collector plate positioned inwardly of said second and third grids, a shielding gird positioned between said third grid and said collector and a shielding plate positioned on the opposite side of said collector from said shielding grid, said grids, said collector plate and said shielding plate being secured in spaced relationship in axial alignment relative to said inlet.

7. A device as claimed in claim 6 wherein said shielding grid includes a collar thereon which extends therefrom to surround said collector plate.

8. A device as claimed in claim 6 wherein said shielding plate includes a collar which extends therefrom and surrounds said collector plate.

9. A device as claimed in claim 5 wherein said shielding grid and said shielding plate each to include a collar that extends therefrom surrounding said collector plate and telescoping each other.

10. A device for detecting and measuring ions and electrons in the upper atmosphere which comprises an ion and electron inlet in which said inlet is open to ambient atmosphere, a first grid secured across said inlet, second and third inner grids spaced from each other and said first grid and electrically connected to each other, a retarding grid and a shielding plate, a collector plate supported by said shielding plate and positioned between said retarding grid and said shielding plate, said retarding grid and shielding plate including skirts which telescope each other and surround said collector plate, said grids, said shielding plate and said collector plate being secured in spaced relationship in axial alignment relative to said inlet.

References Cited by the Examiner
UNITED STATES PATENTS

| | | | |
|---|---|---|---|
| 2,052,617 | 9/1936 | Goldstein | 313—239 |
| 2,548,452 | 4/1951 | Turner | 315—335 X |
| 2,836,790 | 5/1958 | Hickman et al. | 324—33 |
| 3,109,136 | 10/1963 | Asamaki | 324—33 |

GEORGE N. WESTBY, *Primary Examiner.*